(12) United States Patent
Heeks et al.

(10) Patent No.: US 6,336,026 B1
(45) Date of Patent: *Jan. 1, 2002

(54) STABILIZED FLUOROSILICONE TRANSFER MEMBERS

(75) Inventors: George J. Heeks, Rochester; David J. Gervasi, West Henrietta; Arnold W. Henry; Santokh S. Badesha, both of Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,974

(22) Filed: Aug. 17, 1999

(51) Int. Cl.⁷ .................. G03G 15/20; G03G 21/00; B32B 27/00
(52) U.S. Cl. .............. 399/302; 399/307; 399/308; 428/421; 428/447; 524/262; 430/124
(58) Field of Search ............... 524/264, 403, 524/407, 413, 438, 262, 435; 399/325, 308, 302, 307; 428/421, 447; 430/124

(56) References Cited

U.S. PATENT DOCUMENTS

| | | | |
|---|---|---|---|
| 3,002,927 A | 10/1961 | Awe et al. ............... 508/201 |
| 3,893,761 A | 7/1975 | Buchan et al. ............ 399/308 |
| 4,150,181 A | 4/1979 | Smith ....................... 427/444 |
| 4,711,818 A | 12/1987 | Henry ....................... 428/421 |
| 5,208,638 A | 5/1993 | Bujese et al. ............ 399/310 |
| 5,303,014 A | 4/1994 | Yu et al. .................. 399/314 |
| 5,340,866 A * | 8/1994 | Evans ....................... 524/403 |
| 5,395,725 A | 3/1995 | Bluett et al. ............. 430/124 |
| 5,459,008 A | 10/1995 | Chambers et al. ........ 430/126 |
| 5,464,703 A | 11/1995 | Ferrar et al. ............. 428/421 |
| 5,493,376 A | 2/1996 | Heeks et al. ............. 399/324 |
| 5,563,202 A | 10/1996 | Ferrar et al. ............. 524/430 |
| 5,576,818 A | 11/1996 | Badesha et al. .......... 399/308 |
| 5,585,905 A | 12/1996 | Mammino et al. ........ 399/308 |
| 5,612,773 A | 3/1997 | Berkes et al. ............. 399/307 |
| 5,849,399 A * | 12/1998 | Law et al. ................. 428/212 |
| 5,864,740 A | 1/1999 | Heeks et al. ............. 399/325 |
| 5,916,937 A * | 6/1999 | Evans ....................... 524/403 |
| 6,037,092 A * | 3/2000 | Heeks et al. ............. 430/124 |
| 6,045,961 A * | 4/2000 | Heeks et al. ............. 430/124 |

* cited by examiner

*Primary Examiner*—Daniel S. Metzmaier
(74) *Attorney, Agent, or Firm*—Judith L. Byorick (57) ABSTRACT

Disclosed is a transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square. The crosslinked fluorosilicone can be employed as intermediate or outer layers of electrostatographic fuser members.

30 Claims, 4 Drawing Sheets

STABILIZED FLUOROSILICONE TRANSFER MEMBERS

BACKGROUND OF THE INVENTION

The present invention is directed to crosslinked fluorosilicone materials. More specifically, the present invention is directed to thermally stabilized crosslinked fluorosilicone materials suitable for applications such as transfer members for imaging processes and the like. One embodiment of the present invention is directed to a transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which can include a liquid carrier having toner particles dispersed therein. The developer material is advanced into contact with the electrostatic latent image and the toner particles are deposited thereon in image configuration. Subsequently, the developed image is transferred to a copy sheet.

It can be advantageous to transfer the developed image to a transfer member, and subsequently to transfer the developed image from the transfer member to a permanent substrate with very high transfer efficiency. The toner image is subsequently usually fixed or fused upon a support, which can be the photosensitive member itself, or can be any other desired support sheet, such as plain paper.

Transfer members allow for positive attributes such as high throughput at modest process speeds, improved registration of the final color toner image in color systems using synchronous development of one or more component colors using one or more transfer stations, and increased range of final substrates that can be used.

In electrostatographic printing machines wherein the toner image is transferred from the transfer member to the image receiving substrate, the transfer of the toner particles from the transfer member to the image receiving substrate preferably is as complete as possible. Less than complete transfer to the image receiving substrate can result in image degradation and low resolution. Efficient transfer is particularly important when the imaging process entails generating full color images, since undesirable color deterioration in the final colors can occur when the color images are not completely transferred from the transfer member.

Accordingly, the transfer member surface preferably has excellent release characteristics with respect to the toner particles. Conventional materials known in the art for use as transfer members often possess the strength, conformability, and electrical conductivity necessary for use as transfer members, but can suffer from poor toner release characteristics, especially with respect to higher gloss image receiving substrates.

Although use of a release agent increases toner transfer, the transfer member outer layer can swell upon addition of the release agent. For example, silicone rubber performs well as a transfer layer, but swells significantly in the presence of a hydrocarbon fluid release agent. In addition, release properties have been shown to decay from repeated interaction with certain release agents such as hydrocarbon release agents.

Preferably, the resistivity of the transfer member is within a preferred range to allow for sufficient transfer. The transfer member also preferably has a controlled resistivity, wherein the resistivity is virtually unaffected by changes in humidity, temperature, bias field, or operating time. In addition, a controlled resistivity is desirable so that a bias field can be established for electrostatic transfer. The transfer member preferably is not too conductive, since air breakdown can possibly occur in that instance.

Attempts at controlling the resistivity of transfer members have been performed by, for example, adding conductive fillers to the outer layer. Use of carbon black as a conductive filler has been disclosed. Carbon black has been the chosen additive for imparting conductive properties in electrostatographic films. Carbon black is relatively inexpensive and very efficient in that a relatively small percentage can impart a high degree of conductivity. Many doped metal oxides can also be employed to impart desired conductivity to the member.

U.S. Pat. No. 5,864,740 (Heeks et al.), the disclosure of which is totally incorporated herein by reference, discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum.

U.S. Pat. No. 5,493,376 (Heeks), the disclosure of which is totally incorporated herein by reference, discloses a thermally stabilized polyorganosiloxane oil including a polyorganosiloxane oil and, as the thermal stabilizer, the reaction product of chloroplatinic acid and a member selected from the group consisting of a cyclic polyorganosiloxane having the formula where $R_3$ is an alkyl radical having 1 to 6 carbon atoms and $R_4$ is selected from the group consisting of alkene and alkyne radicals having 2 to 8 carbon atoms, and n is from 3 to 6; a linear polyorganosiloxane having the formula wherein $R_1$ and $R_2$ are selected from the group consisting of hydroxy and alkyl, alkoxy, alkene, and alkyne radicals having 1 to 10 carbon atoms, provided that at least one of $R_1$ and $R_2$ is alkene or alkyne, and m is from 0 to 50; and mixtures thereof, present in an amount to provide at least 5 parts per million of platinum in said oil.

U.S. Pat. No. 5,395,725 (Bluett et al.), the disclosure of which is totally incorporated herein by reference, discloses a process for fusing toner images to a substrate which comprises providing a fusing member having a fusing surface; heating the fuser member to an elevated temperature to fuse toner to the substrate; and applying directly to the fusing surface a fuser release agent oil blend composition; wherein volatile emissions arising from the fuser release agent oil blend are minimized or eliminated.

U.S. Pat. No. 4,150,181 (Smith), the disclosure of which is totally incorporated herein by reference, discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 3,002,927 (Awe et al.), the disclosure of which is totally incorporated herein by reference, discloses organosilicon fluids capable of withstanding high temperatures which are prepared by preoxygenating the fluid by heating a mixture of (1) a polysiloxane fluid in which the siloxane units are selected from the group consisting of units of the formula $R_3SiO_{0.5}$, $R_2SiO$, $RSiO_{1.5}$, and $SiO_2$ in which each R is selected from the group consisting of methyl, phenyl, chlorophenyl, fluorophenyl, and bromophenyl radicals, (2) a ferric salt of a carboxylic acid having from 4 to 18 carbon atoms in an amount such that there is from 0.005 to 0.03 percent by weight iron based on the weight of (1), and (3) oxygen mechanically dispersed in the fluid at a temperature above 400° F. until the mixture changes to a reddish brown color and until the mixture will not form a precipitate when heated in the absence of oxygen at a temperature above that at which the preoxygenation step is carried out.

U.S. Pat. No. 4,711,818 (Henry), the disclosure of which is totally incorporated herein by reference, discloses a thermally conductive dry release fuser member and fusing method for use in electrostatic reproducing machines without the application of a release agent. The fuser member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent, and a crosslinking catalyst.

U.S. Pat. No. 5,464,703 (Ferrar et al.) and U.S. Pat. No. 5,563,202 (Ferrar et al.), the disclosures of each of which are totally incorporated herein by reference, disclose a fuser member useful for heat fixing an electrographic toner to a substrate, a composition of matter, and its preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

U.S. Pat. No. 5,585,905 (Mammino et al.), the disclosure of which is totally incorporated herein by reference, discloses an intermediate toner transfer member for use in an electrostatographic printing apparatus employing a liquid developer comprising: (a) a substrate; and (b) an outer layer comprising a fluoroelastomer polymerized from a plurality of monomers, at least one monomer being an olefin having only carbon atoms and hydrogen atoms, and at least one monomer being fluorinated.

U.S. Pat. No. 5,303,014 (Yu et al.), the disclosure of which is totally incorporated herein by reference, discloses a bias transfer member including a peripheral surface having low surface energy. The low surface energy provides improved cleanability for enhancing the electrostatographic process and increasing the life of the bias transfer member. A low surface energy layer is provided by plasma fluorination to modify chemically the makeup of the surface material or by coating to form a low surface energy layer on the bias transfer member.

U.S. Pat. No. 5,576,818 (Badesha et al.), the disclosure of which is totally incorporated herein by reference, discloses an intermediate toner transfer component including: (a) an electrically conductive substrate; (b) a conformable and electrically resistive layer comprising a first polymeric material; and (c) a toner release layer comprising a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 5,612,773 (Berkes et al.), the disclosure of which is totally incorporated herein by reference, discloses a transfusing member having a compression layer comprising a highly conformable, low durometer material with a low surface tension. The transfusing member forms a first transfer nip characterized by a first pressure with a photoreceptive surface and a second transfer nip characterized by a second pressure, which is of the same order of magnitude as the first pressure, with a backup roller.

U.S. Pat. No. 3,893,761 (Buchan et al.), the disclosure of which is totally incorporated herein by reference, discloses an apparatus for transferring non-fused xerographic toner images from a first support material, such as a photoconductive insulating surface, to a second support material, such as paper, and fusing the toner images to the second support material. Such apparatus includes an intermediate transfer member having a smooth surface of low surface free energy and a hardness of from 3 to 70 durometers. The intermediate transfer member can be, for example, a 0.1 to 10 mil layer of silicone rubber coated onto a polyimide support. The member can be formed into belt or drum configuration. Toner images are transferred from the first support material to the intermediate transfer member; this transfer can be by any conventional transfer method, but pressure transfer is preferred. Next, the toner image is heated on the intermediate transfer member to at least its melting point temperature. Preferably the heating is selective, and one means of selectively heating toner is to provide radiant heating means and a belt formed from a transparent silicone rubber on a reflecting intermediate member support. After the toner is heated, second support material is brought into pressure contact with hot toner whereby toner is transferred and fused to the second support material. In preferred embodiments, a pressure applying element is used to provide a pressure pulse which has a steep rise time at the point where the intermediate transfer member and second support material come into contact. A method of transferring and fusing toner images is also disclosed.

U.S. Pat. No. 5,208,638 (Bujese et al.), the disclosure of which is totally incorporated herein by reference, discloses an improved intermediate transfer surface employing a conductive fluoropolymer material and preferably a conductive material dispersed in a fluoroelastomer layer for use in electrostatic color image transfers. The intermediate fluoropolymer transfer surface is heat and solvent resistant and retains its electrical conductivity upon exposure to both heat and solvent, while exhibiting excellent thermal release characteristics for contact transfers of dried liquid color toners. A method of xeroprinting a color image onto a receiving substrate using a first electrostatic transfer through a liquid-filled gap to the conductive intermediate transfer surface and then a second contact transfer from the conductive intermediate fluoropolymer transfer surface to a final receiving surface is also disclosed.

U.S. Pat. No. 5,459,008 (Chambers et al.), the disclosure of which is totally incorporated herein by reference, discloses the complete toner transfer from the surface of an intermediate transfer member of an electrostatic printing machine to an image receiving substrate such as paper that can range in gloss from low to very high. This transfer is accomplished by the use of a thin film coating of a release agent material upon the surface of the intermediate transfer member or by the incorporation of a release agent material onto or into toner particles.

Copending application U.S. Ser. No. 09/375,968, filed concurrently herewith, now U.S. Pat. No. 6,045,961 entitled "Thermally Stable Silicone Fluids," with the named inventors George J. Heeks, David J. Gervasi, Arnold W. Henry, and Santokh S. Badesha, the disclosure of which is totally incorporated herein by reference, discloses a fuser release agent comprising (a) a polyorganosiloxane, and (b) a stabilizing agent comprising the reaction product of (i) a metal acetylacetonate or metal oxalate compound, (ii) a linear unsaturated-alkyl-group-substituted polyorganosiloxane, and (iii) a cyclic unsaturated-alkyl-group-substituted polyorganosiloxane.

Copending application U.S. Ser. No. 09/375,592, filed concurrently herewith, entitled "Stabilized Fluorosilicone Materials," with the named inventors George J. Heeks, David J. Gervasi, Arnold W. Henry, and Santokh S. Badesha, the disclosure of which is totally incorporated herein by reference, discloses a composition comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

Copending application U.S. Ser. No. 09/376,747, filed concurrently herewith, now U.S. Pat. No. 6,037,092 entitled "Stabilized Fluorosilicone Fuser Members," with the named inventors George J. Heeks, David J. Gervasi, Arnold W. Henry, and Santokh S. Badesha, the disclosure of which is totally incorporated herein by reference, discloses a fuser member comprising a substrate and at least one layer thereover, said layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

While known compositions and processes are suitable for their intended purposes, a need remains for improved silicone rubber materials. In addition, a need remains for transfer members exhibiting thermal conductivity, hardness, and toughness. Further, there is a need for transfer members of silicone rubbers exhibiting reduced swelling in solvents and silicone oils. Additionally, there is a need for transfer members of fluorosilicone rubbers that are stable at high temperatures. There is also a need for fluorosilicone materials that exhibit improved stability at high temperatures. In addition, there is a need for fluorosilicone materials that emit reduced amounts of undesirable materials such as trifluoropropionaldehyde or formaldehyde at high temperatures. Further, there is a need for fluorosilicone transfer members with improved environmental, health, and safety characteristics. Additionally, there is a need for transfer belt materials possessing release and solvent resistance properties exhibited by fluorosilicone elastomers. A need also remains for transfer belt materials that can be tailored for the desired electrical characteristics while maintaining a low surface energy.

SUMMARY OF THE INVENTION

The present invention is directed to a transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square.

DETAILED DESCRIPTION OF THE INVENTION

The term "transfer member", as used herein refers both to intermediate transfer members, wherein a developed image is transferred to the intermediate transfer member, followed by transfer of the image from the intermediate transfer member to a copy substrate, and followed by fusing of the image to the copy substrate, and to transfuse or transfix members, wherein a developed image is transferred to the transfuse or transfix member, followed by simultaneous transfer of the image from the transfuse or transfix member to a copy substrate and fusing or fixing of the image thereto.

Figure 1:
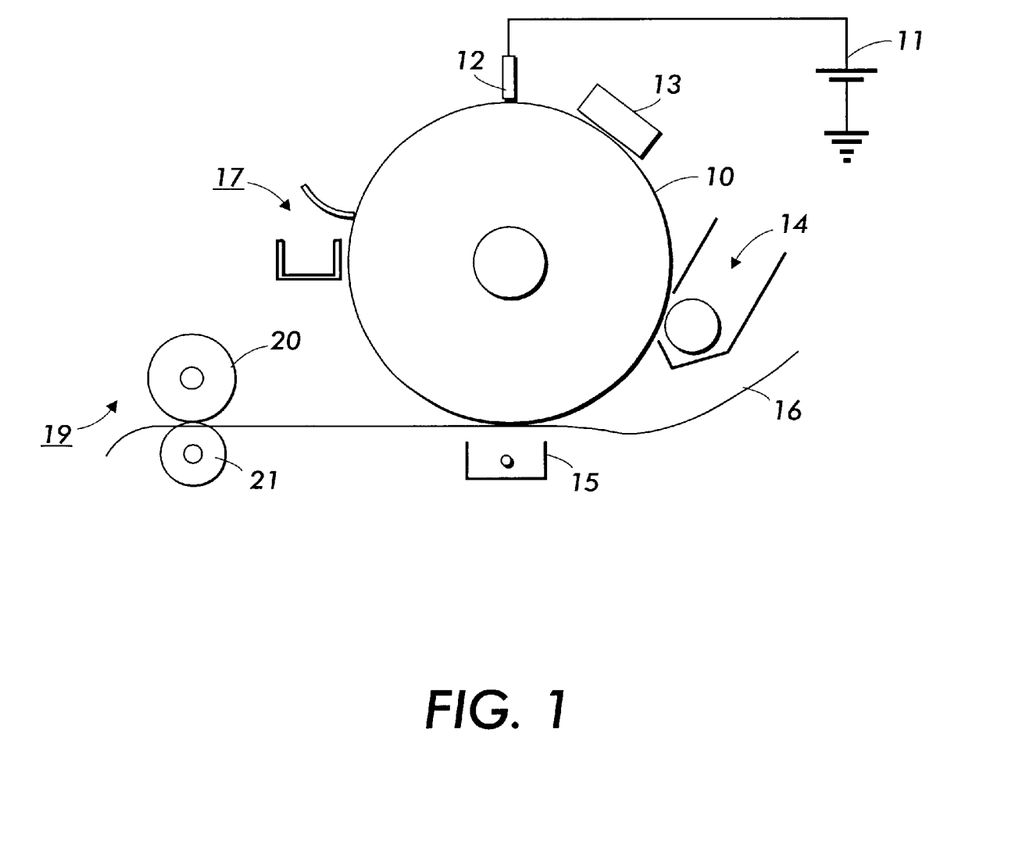
FIG. 1 is a schematic illustration of an imaging apparatus according to the present invention.

Referring to FIG. 1, in a typical electrostatographic imaging apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development processes. A dry developer mixture usually comprises carrier granules having toner particles adhering triboelectrically thereto. Toner particles are attracted from the carrier granules to the latent image forming a toner powder image thereon. Alternatively, a liquid developer can be employed, which includes a liquid carrier having toner particles dispersed therein. The liquid developer is advanced into contact with the electrostatic latent image and the toner particles are deposited thereon in image configuration.

After the toner particles have been deposited on the photoconductive surface in image configuration, they are transferred to a copy sheet 16 by transferring element 15, which can be pressure transfer, electrostatic transfer, or the like. Alternatively, the developed image can be transferred to a transfer member and subsequently transferred to a copy sheet. Examples of suitable copy substrates include paper, transparency material, such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing members such as a fuser belt in contact with a pressure roll, a fuser roll in contact with pressure belt, or the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix or transfuse apparatus.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

The transfer member employed for the present invention can be of any suitable configuration. Examples of suitable configurations include a sheet, a film, a web, a foil, a strip, a coil, a cylinder, a drum, an endless mobius strip, a circular disc, a belt, including an endless belt, an endless seamed flexible belt, an endless seamless flexible belt, an endless belt having a puzzle cut seam, and the like. Examples of such belts are described in U.S. Pat. No. 5,487,707, U.S. Pat. No. 5,514,436, and Copending Application U.S. Ser. No. 08/297,203, filed Aug. 29, 1994, the disclosures of each of which are totally incorporated herein by reference. A method for manufacturing reinforced seamless belts is set forth in U.S. Pat. No. 5,409,557, the disclosure of which is totally incorporated herein by reference.

The transfer members of the instant invention can be employed in either an image on image transfer, or a tandem transfer of a toned image(s) from the photoreceptor to the intermediate transfer member, or in a transfix or transfuse system for simultaneous transfer and fusing of the developed and transferred image to the copy substrate. In an image on image transfer, the color toner images are first deposited on the photoreceptor, and all of the color toner images are then transferred simultaneously to the transfer member. In a tandem transfer, the toner image is transferred one color at a time from the photoreceptor to the same area of the transfer member.

Transfer of the developed image from the imaging member to the transfer element and transfer of the image from the transfer element to the substrate can be by any suitable technique conventionally used in electrophotography, such as corona transfer, pressure transfer, bias transfer, and the like, as well as combinations of those transfer methods, In the situation of transfer from the intermediate transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential, typically of from about 5,000 to about 8,000 volts, provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically, four image forming devices are used. The image forming devices can each comprise an image receiving member in the form of a photoreceptor or other image receiving member. The transfer member of this embodiment of the present invention is supported for movement in an endless path such that incremental portions thereof move past the image forming devices for transfer of an image from each of the image receiving members. Each image forming device is positioned adjacent to the transfer member to enable sequential transfer of different color toner images to the transfer member in superimposed registration with one another.

The transfer member moves such that each incremental portion thereof first moves past an image forming device and comes into contact with a developed color image on an image receiving member. An optional transfer device, which can comprise a corona discharge device, serves to effect transfer of the color component of the image at the area of contact between the receiving member and the transfer member. In a like fashion, image components of colors such as red, blue, brown, green, orange, magenta, cyan, yellow, and black, corresponding to the original document also can be formed on the transfer member one color on top of the other to produce a full color image.

A transfer sheet or copy sheet is moved into contact with the toner image on the transfer member. A bias member can be used to provide good contact between the copy sheet and the toner image at the transfer station. A corona transfer device also can be provided for assisting the bias member in effecting image transfer to the copy sheet. These imaging steps can occur simultaneously at different incremental portions of the transfer member. Further details regarding this transfer method are disclosed in, for example, U.S. Pat.

No. 5,298,956, the disclosure of which is totally incorporated herein by reference.

The transfer member can be employed in various devices including, but not limited to, devices described in, for example, U.S. Pat. No. 3,893,761, U.S. Pat. No. 4,531,825, U.S. Pat. No. 4,684,238, U.S. Pat. No. 4,690,539, U.S. Pat. No. 5,119,140, and U.S. Pat. No. 5,099,286; the disclosures of each of which are totally incorporated herein by reference.

Figure 2:
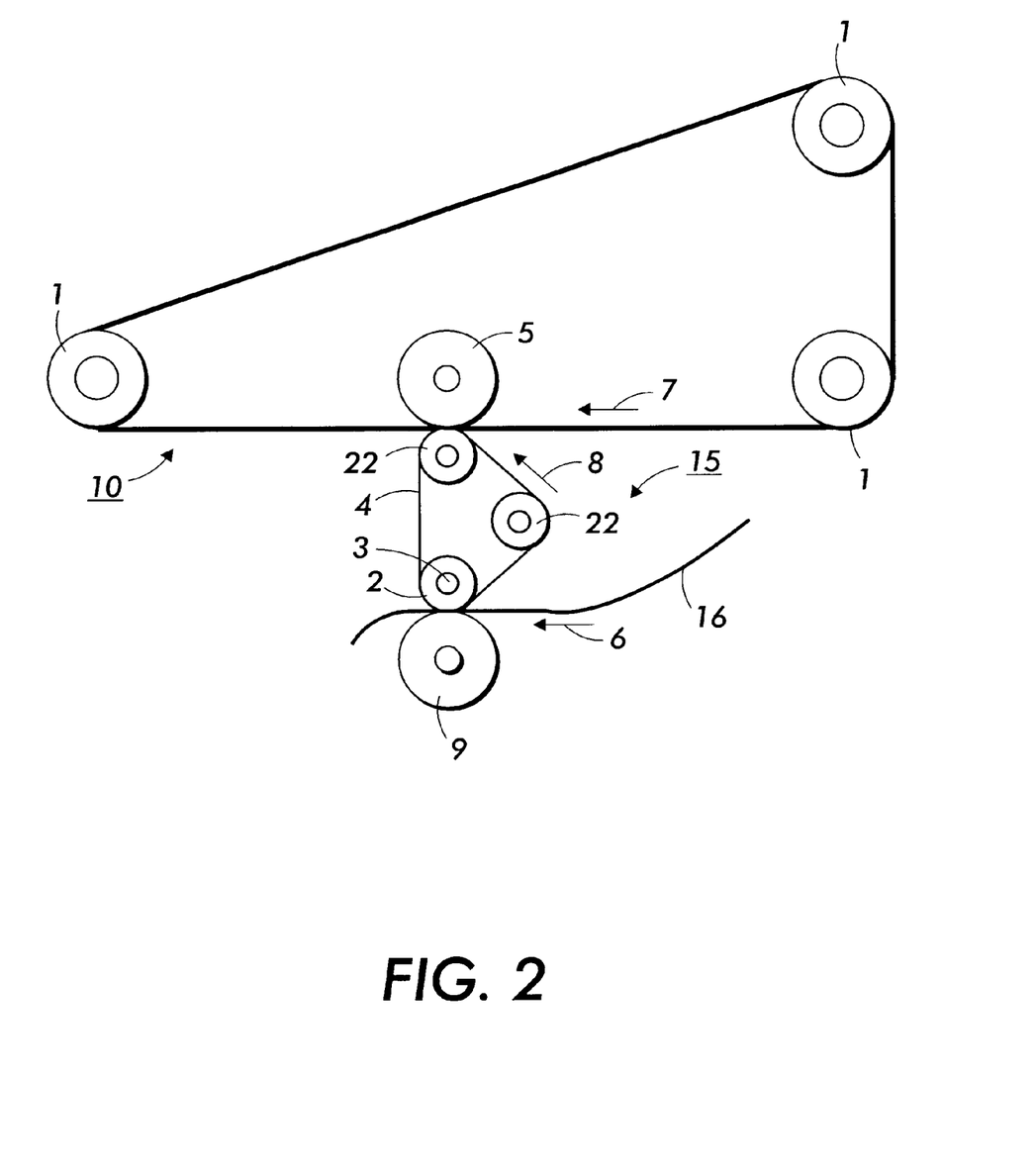
FIG. 2 is an illustration of one embodiment of the present invention, and represents a transfuse or transfix transfer member according to the present invention.

In one embodiment of the present invention, transfer and fusing can occur simultaneously in a transfix or transfuse configuration. As shown in FIG. 2, a transfer apparatus 15 is depicted as transfix belt 4 (although configurations other than a belt, such as a roll, a sheet, or the like, are also suitable) being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact between photoreceptor 10 and transfix belt 4 occurs. Pressure roll 5 aids in transfer of the developed image from photoreceptor 10 to transfix belt 4. The transferred image is subsequently transferred to copy substrate 16 and simultaneously fixed to copy substrate 16 by passing the copy substrate 16 between transfix belt 4 (containing the developed image) and pressure roll 9. A nip is formed between heated roll 2 (with heating element 3 contained therein) and pressure roll 9. Copy substrate 16 passes through the nip formed by heated roll 2 and pressure roll 9, and simultaneous transfer and fusing of the developed image to the copy substrate 16 occurs.

Figure 3:
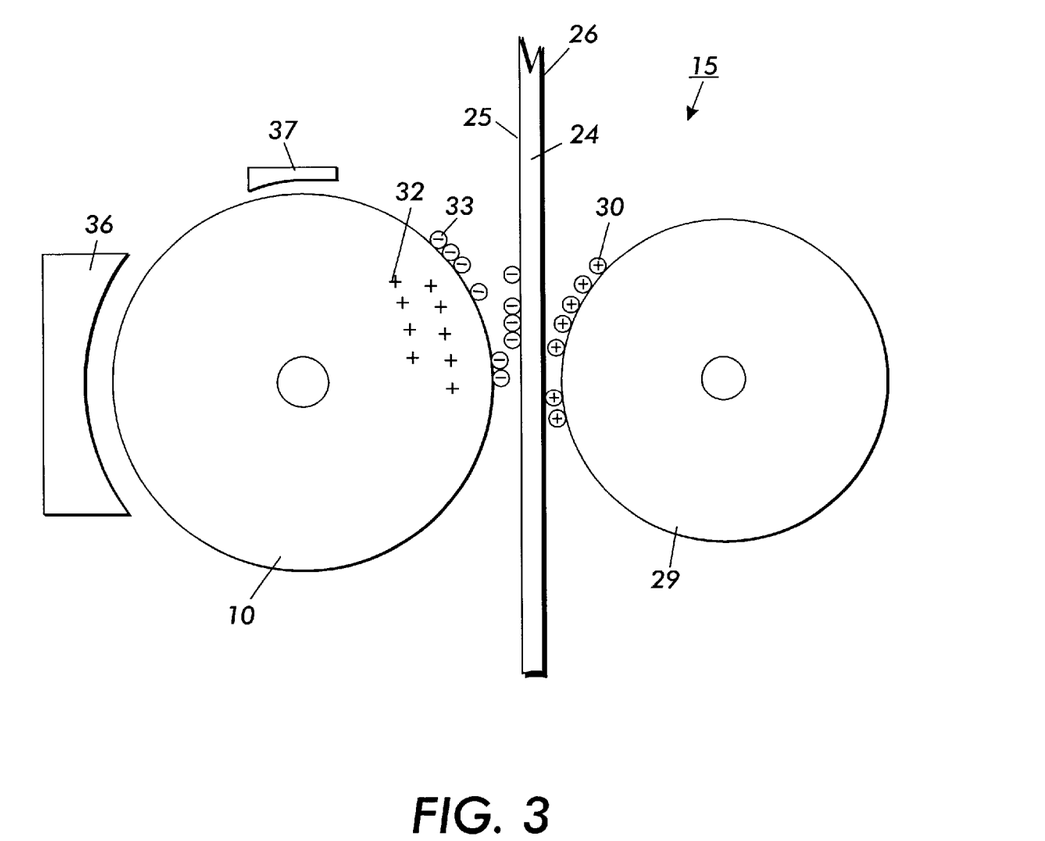
FIG. 3 is a schematic view of an image development system containing an intermediate transfer member.

FIG. 3 demonstrates another embodiment of the present invention and depicts a transfer apparatus 15 comprising an intermediate transfer member 24 positioned between an imaging member 10 and a transferring element 29. The imaging member 10 is exemplified by a photoreceptor drum. However, other appropriate imaging members can include other electrostatographic imaging receptors such as ionographic belts and drums, electrophotographic belts, and the like.

In the multi-imaging system of FIG. 3, each image being transferred is formed on the imaging drum by image forming station 36. Each of these images is then developed at developing station 37 and transferred to intermediate transfer member 24. Each of the images can be formed on the photoreceptor drum 10 and developed sequentially and then transferred to the intermediate transfer member 24. In an alternative method, each image can be formed on the photoreceptor drum 10, developed, and transferred in registration to the intermediate transfer member 24. In one embodiment of the invention, the multi-image system is a color copying system. In this color copying system, each color of an image being copied is formed on the photoreceptor drum. Each color image is developed and transferred to the intermediate transfer member 24. As described hereinabove, each of the colored images can be formed on the drum 10 and developed sequentially and then transferred to the intermediate transfer member 24. In the alternative method, each color of an image can be formed on the photoreceptor drum 10, developed, and transferred in registration to the intermediate transfer member 24.

After latent image forming station 36 has formed the latent image on the photoreceptor drum 10 and the latent image of the photoreceptor has been developed at developing station 37, the charged toner particles 33 from the developing station 37 are attracted and held by the photoreceptor drum 10 because the photoreceptor drum 10 possesses a charge 32 opposite to that of the toner particles 33. In FIG. 3, the toner particles are shown as negatively charged and the photoreceptor drum 10 is shown as positively charged. These charges can be reversed, depending on the nature of the toner and the machinery being used.

A biased member 29 positioned opposite the photoreceptor drum 10 has a higher voltage than the surface of the photoreceptor drum 10. As shown in FIG. 3, biased roller 29 charges the backside 26 of intermediate transfer member 24 with a positive charge. In an alternative embodiment of the invention, a corona or any other charging mechanism can be used to charge the backside 26 of the intermediate transfer member 24. These imaging steps can occur simultaneously at different incremental portions of the intermediate transfer member. Further details of the transfer method employed herein are set forth in U.S. Pat. No. 5,298,956, the disclosure of which is hereby incorporated by reference in its entirety.

The negatively charged toner particles 33 are attracted to the front side 25 of the intermediate transfer member 24 by the positive charge 30 on the backside 26 of the intermediate transfer member 24.

The transfer member of the present invention can be in the form of a sheet, web, or belt as it appears in FIGS. 2 and 3, or in the form of a roller or other suitable shape. In one preferred embodiment of the invention, the transfer member is in the form of a belt. In another embodiment of the invention, not shown in the figures, the transfer member can be in the form of a sheet.

Figure 4:
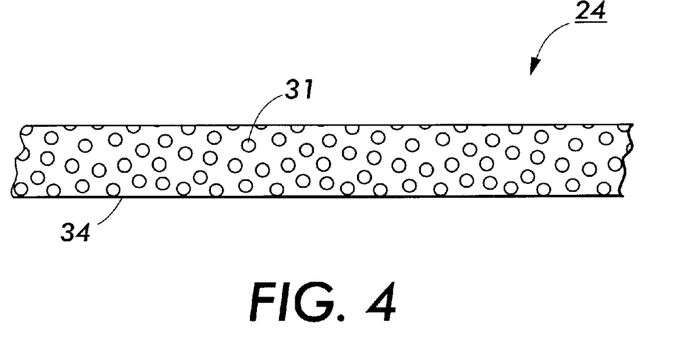
FIG. 4 is a schematic illustration of another embodiment of the present invention, and represents a transfer member according to the present invention having a one layer configuration.

The transfer member can be in the form of a single layer. In this embodiment, as shown in FIG. 4, the transfer member is in the form of sheet 24 comprising a crosslinked fluorosilicone layer 34 optionally having conductive fillers 31 dispersed therein. The single layer belt preferably has a thickness of from about 75 to about 1,500 microns, and preferably from about 250 to about 750 microns, although the thickness can be outside of these ranges.

The one-layer member illustrated herein, preferably in the form of a belt, typically has a width of from about 300 to about 2,000 millimeters, and preferably from about 300 to about 900 millimeters, although the width can be outside of these ranges. The circumference of the belt member typically is from about 500 to about 3,600 millimeters, and preferably from about 525 to about 1,100 millimeters, although the circumference can be outside of these ranges.

The one layer member can be prepared by adding an appropriate amount of any desired fillers to the member layer fluorosilicone mixture to provide the desired surface resistivity, typically from about $10^4$ to about $10^{16}$ ohms per square, preferably from about $10^6$ to about $10^{14}$ ohms per square, and more preferably from about $10^8$ to about $10^{12}$ ohms per square, although the surface resistivity can be outside of these ranges. The filler is added and the mixture is pebble milled in a roll mill, attritor, sand mill, or the like. After addition of the filler particles, the fluorosilicone layer is crosslinked to form a solid. The fluorosilicone layer can be formed by extrusion into a sheet or into an endless loop by known methods. In another embodiment, the two ends of the member can be joined by heat or pressure and the resulting seam can be coated with an adhesive filler material and/or sanded to produce a seamless member by mechanical devices such as a pad or roller with single or multiple grades or abrasive surfaces, a skid plate, electronic laser ablation mechanism, or chemical treatment, as practiced in the art. In a preferred embodiment of the invention, the member is in the form of an endless seamed or seamless belt. The seam can impart a puzzle cut configuration as described in U.S. Pat. Nos. 5,487,707; 5,514,436; and U.S. patent application Ser. No. 08/297,203 filed Aug. 29, 1994, the disclosures of each of which are incorporated herein by reference in their entirety. A method for manufacturing reinforced seamless belts is set forth in U.S. Pat. No. 5,409,557, the disclosure of which is hereby incorporated by reference in its entirety.

Figure 5:
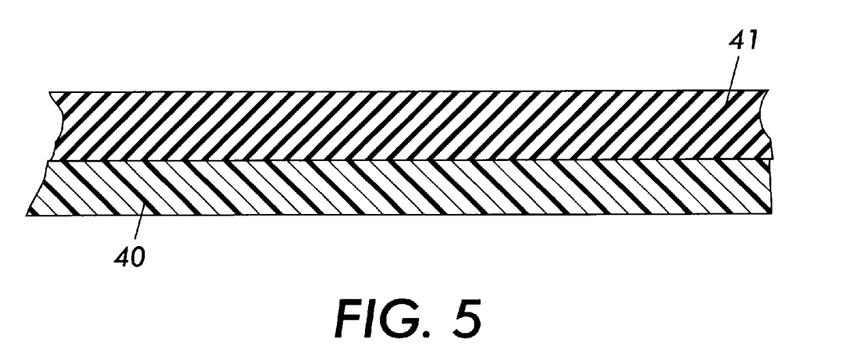
FIG. 5 is an illustration of yet another embodiment of the present invention, and represents a transfer member according to the present invention having a two layer configuration.

The transfer member material can also be coated on a substrate. In another embodiment of the invention, as shown in FIG. 5, the transfer member is in the form of a two layer configuration. Included therein is a substrate 40 and a crosslinked fluorosilicone outer layer 41. The substrate imparts mechanical strength to the transfer member.

The substrate can comprise polyamide or polyimide polymers, silicone rubbers, fluorocarbon elastomers such as are available under the trademark VITON® from E.I. duPont de Nemours & Co., polyvinyl fluoride such as that available under the tradename TEDLAR® from E.I. duPont de Nemours & Co, various fluoropolymers, such as polytetrafluoroethylene (PTFE), perfluoroalkoxy (PFA-TEFLON®), fluorinated ethylenepropylene copolymer (FEP), other TEFLON®-like materials, and the like, as well as mixtures thereof. Also suitable are polyamideimide, polyimide, polyaramide, polyphthalamide, polyphenylene sulfide, polyethylene naphthalate, epoxies, acrylonitrile butadiene-styrene polycarbonates (ABS), polyacrylics, polyvinylfluoride, polyethylene terephthalate (PET), polyether ether ketone (PEEK), and urethanes. Preferred urethanes include polyester-, polyether-, and polycaprolactone-based urethanes, available from, for example, Uniroyal, Bayer, Conap, and the like. Other suitable substrate materials include papers, metals, and elastomer materials. If the substrate is in the form of a cylindrical roll or belt, the roll or belt can comprise a metal such as aluminum, tin, stainless steel, nickel, metallic alloys, or the like, or can comprise a heat resistant elastomer material such as urethanes, EPDM, nitriles, fluorocarbon elastomers, silicone rubbers, epichlorohydrin, and the like. Fabric materials are also suitable substrates, such as those disclosed in copending application U.S. Ser. No. 09/050135, filed Mar. 30, 1998, entitled "Fabric Fuser Film," the disclosure of which is totally incorporated herein by reference, and the like. Fabrics are materials made from fibers or threads and woven, knitted, or pressed into cloth or felt type structures. Woven, as used herein, refers to closely oriented by warp and filler strands at right angles to each other. Nonwoven, as used herein, refers to randomly integrated fibers or filaments. The fabric material useful as the substrate herein preferably allows a high operating temperature (i.e., greater than about 180° C., and preferably greater than about 200° C.), is capable of exhibiting high mechanical strength, provides heat insulating properties (which, in turn, improve the thermal efficiency of the proposed fusing system), and possesses electrical insulating properties. In addition, it is preferred that the fabric substrate have a flexural strength of from about 2,000,000 to about 3,000,000 pounds per square inch, and a flexural modulus of from about 25,000 to about 55,000 pounds per square inch, although the flexural strength and modulus can be outside of these ranges. Examples of suitable fabrics include woven or nonwoven cotton fabric, graphite fabric, fiberglass, woven or nonwoven polyimide (for example KELVAR®, available from DuPont), woven or nonwoven polyamide, such as nylon or polyphenylene isophthalamide (for example, NOMEX®, available from DuPont), polyester, polycarbonate, polyacryl, polystyrene, polyethylene, polypropylene, and the like.

The outer layer of the two layer configuration comprises a crosslinked fluorosilicone. The thickness of the substrate layer in the two layer configuration typically is from about 2 to about 6,000 microns, and preferably from about 10 to about 1500 microns, although the thickness can be outside of these ranges. The outer layer comprising the uncrosslinked fluorosilicone is coated onto the substrate or onto any intermediate layers situated between the substrate and the outer layer. Thereafter, crosslinking of the fluorosilicone is effected.

Figure 6:
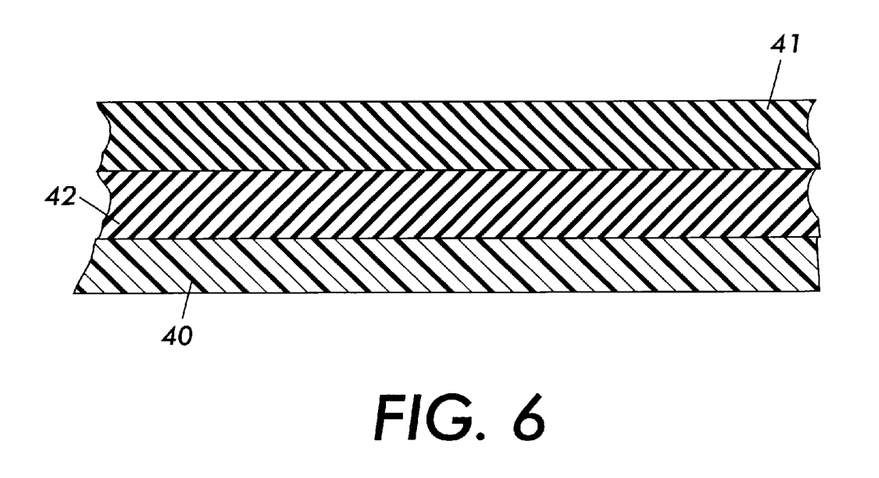
FIG. 6 is an illustration of still another embodiment of the present invention, and represents a transfer member according to the present invention having a three layer configuration.

In a third embodiment, as depicted in FIG. 6, the transfer member is in the form of a three layer configuration. This three layer configuration provides superior conformability and is suitable for use with liquid toner, and is especially desirable in color xerographic machines. In this three layer configuration, the transfer member comprises a substrate 40 as defined above, an intermediate layer 42 on the substrate, and an outer release layer 41 of the crosslinked fluorosilicone on intermediate layer 42. The intermediate layer preferably is able to adhere both to the outer layer and to the substrate material. The intermediate layer can be applied as a preformed sheet or film using known lamination processes, or can be applied as a liquid and subsequently caused to solidify by, for example, evaporation, curing, or the like.

Examples of suitable intermediate layer materials include rigid and conformable polymers, including thermalset and thermoset polymers. Examples of thermoset and thermalset polymers include fluoropolymers, chloropolymers, silicone rubbers, polyimides, polyamides, polypropylenes, polyethylenes, polybutylenes, polyarylenes, acrylonitriles, polycarbonates, polysulfones, ethylene diene propene monomer polymers, nitrile rubbers, and the like, as well as mixtures thereof. Typically, the intermediate layer is used to impart conformability to different substrates during the printing process.

Particularly useful fluoropolymers intermediate layers include TEFLON®-like materials such as polytetrafluoroethylene (PTFE), fluorinated ethylenepropylene copolymers (FEP), perfluorovinylalkylether tetrafluoroethylene copolymers (PFA TEFLON®), polyethersulfone, fluorosilicones, copolymers and terpolymers thereof, and the like. Also preferred are fluoroelastomers such as those described in, for example, U.S. Pat. No. 5,166,031, U.S. Pat. No. 5,281,506, U.S. Pat. No. 5,366,772, U.S. Pat. No. 5,370,931, U.S. Pat. No. 4,257,699, U.S. Pat. No. 5,017,432, and U.S. Pat. No. 5,061,965, the disclosures of each of which are totally incorporated herein by reference. These fluoroelastomers, particularly from the class of copolymers, terpolymers, and tetrapolymers of vinylidenefluoride, hexafluoropropylene, and tetrafluoroethylene and a possible cure site monomer, are known commercially under various designations as VITON A®, VITON E®, VITON E60C®, VITON E430®, VITON 910®, VITON GH® VITON GF®, VITON E45®, VITON A201C®, and VITON B50®. The VITON® designation is a Trademark of E.I. Du Pont de Nemours & Co. Other commercially available materials include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS®, a poly(propylene-tetrafluoroethylene), and FLUOREL II® (LII900), a poly (propylene-tetrafluoroethylenevinylidenefluoride), both also available from 3M Company, as well as the TECNOFLONS® identified as FOR-60KIR®, FOR-LHF®, NM® FOR-THF®, FOR-TFS®, TH®, and TN505®, available from Montedison Specialty Chemical Company. In another preferred embodiment, the fluoroelastomer is one having a relatively low quantity of vinylidenefluoride, such as in VITON GF®, available from DuPont. The VITON GF® contains about 35 weight percent vinylidenefluoride, about 34 weight percent hexafluoropropylene, and about 29 weight percent tetrafluoroethylene, with about 2 weight percent cure site monomer. Suitable cure site monomers include those available from DuPont, such as 4-bromoperfluorobutene-1,1,1-dihydro-4-bromoperfluorobutene-1,3-bromoperfluoropropene-1,1,1-dihydro-3-bromoperfluoropropene-1, or any other suitable or desired cure site monomer. Other suitable fluoropolymers include hybrid fluoroelastomers, such as volume grafted fluoroelastomers, titamers, grafted titamers, ceramers, grafted ceramers, and the like.

In one embodiment, the intermediate layer 42 comprises an adhesive material. In the case of a three layer configuration, very strong adhesives are useful to prevent or reduce the occurrence of delamination, or the pulling away of the outer layer from the substrate. Delamination is caused by the excessive force attributable to the numerous turns of a roller, or numerous revolutions of a belt around a set of rollers during normal machine operations. It is preferable to use higher molecular weight adhesives. Typically, the higher molecular weight adhesives require dissolving in a solvent for processing. It is, however, preferable to use solventless adhesives. Solventless adhesive, as used herein, refers to materials that are liquid at room temperature (about 25° C.) and are able to crosslink to an elastic or rigid film to adhere at least two materials together. These solventless adhesive materials typically contain from about 0 to about 5 percent by weight volatile or solvent material, preferably from about 0.01 to about 3 percent by weight volatile or solvent material, and more preferably from about 0.01 to about 1 percent by weight volatile or solvent material, although the amount can be outside of these ranges. There are several chemical classes of solventless adhesives, such as epoxies, urethanes, silicones, and the like. Specific examples include 100 percent solids adhesives, including polyurethane adhesives commercially available from Lord Corporation, Erie, Pa., such as TYCEL®7924 (viscosity from about 1400 to about 2000 centipoise), TYCEL®7975 (viscosity from about 1200 to about 1600 centipoise) and TYCEL®7276. The viscosity range of the adhesives is from about 1200 to about 2000 centipoise. The solventless adhesives can be activated with either heat, room temperature curing, moisture curing, ultraviolet radiation, infrared radiation, electron beam curing, or any other curing technique.

Any other suitable adhesive material can also be positioned between the crosslinked fluorosilicone layer and the substrate. Examples of additional suitable adhesives include ultraviolet thermal plastic and thermal set adhesives, such as polyesters, epoxies, urethanes, polyimides, polyamides, polyvinyl butyrals, silicones, and other stable high temperature adhesives. Additional examples of suitable adhesives include Dow Corning® A 4040 prime coat, which is especially effective when used with fluorosilicone layers, and Dow Tactix® blends, Ciba-Geigy Araldite® MY-721 and Morton Thixon 330/311, all of which are suitable for use with fluoropolymer and silicone rubber layers. Other suitable adhesives include acrylates, polyesters, cyanoacrylates, and also pressure sensitive adhesives.

The transfer member can, if desired, employ electrically conductive particles dispersed in the fluorosilicone layer or in the substrate. These electrically conductive particles can be used to decrease the base material resistivity into the desired surface resistivity range, typically from about $10^4$ to about $10^{16}$ ohms per square, preferably from about $10^6$ to about $10^{14}$ ohms per square, and more preferably from about $10^8$ to about $10^{12}$ ohms per square, although the surface resistivity can be outside of these ranges. The desired volume resistivity typically is from about $10^4$ to about $10^{11}$ ohm-centimeters, and preferably from about $10^7$ to about $10^{11}$ ohm-centimeters. The desired resistivity can be provided by varying the concentration of the conductive filler.

One example of a suitable conductive filler is a doped metal oxide contained or dispersed in the fluorosilicone outer layer. The doped metal oxide can also be contained or dispersed in any of the other layers. Preferred doped metal oxides include antimony doped tin oxide, aluminum doped zinc oxide, antimony doped titanium dioxide, similar doped metal oxides, and the like, as well as mixtures thereof. The doped metal oxide typically is added to the outer layer (or other layer) in an amount of about 1 to about 65 percent by weight of total solids, preferably from about 5 to about 30 percent by weight of total solids, and more preferably from about 5 to about 10 percent by weight of total solids, although the amount can be outside of these ranges. Total solids is defined as the amount of polymer, filler(s), and any additives.

Additives and additional fillers can be present in any of the above-described layers. Additives include dispersing agents, rheology control agents, various pigment fillers, which can be ionic in nature and can also exhibit electrical regulating properties, tensile modulus enhancing materials, such as fibers and wax fluoropolymer pigments, colorants, and the like.

The outer layer or outer and intermediate layers can be deposited on the substrate by any suitable or desired method. Known methods for forming the outer layer(s) on the substrate include liquid and dry powder spray coating, such as by multiple spray applications of very thin films, dip coating, casting, flow-coating, web-coating, roll-coating, extrusion, molding, wire wound rod coating, fluidized bed coating, powder coating, electrostatic spraying, sonic spraying, blade coating, molding, laminating, or the like. A method for manufacturing reinforced seamless belts is disclosed in, for example, U.S. Pat. No. 5,409,557, the disclosure of which is totally incorporated herein by reference. Other techniques which can also be used for fabricating films or belts include ultrasonic or impulse welding. It is preferred to spray or flow coat the uncrosslinked fluorosilicone material when the thickness desired is about 125 microns.

Optionally, if desired, a release agent can be applied to the outer layer of the transfer member as a relatively thin coating prior to transfer of the developer material. Alternatively, the release agent can be continuously applied to the transfer member. The release agent can be applied to the transfer member by a wick, roller, or any other known application member. The optional release agent typically is supplied in an amount of from about 0.1 to about 15 microliters per copy, and preferably from about 0.1 to about 2 microliters per copy, although the amount can be outside of these ranges. The thin film of the release agent typically has a thickness of from about 2 to about 125 microns, preferably from about 8 to about 75 microns, and more preferably from about 12 to about 25 microns, although the thickness can be outside of these ranges.

The outer layer of the transfer member of the present invention comprises a crosslinked fluorosilicone polymer. This layer is prepared by first preparing a liquid composition containing the uncrosslinked fluorosilicone polymer, a crosslinking agent, and a thermal stabilizer according to the present invention as disclosed hereinbelow, as well as any desired optional fillers or other optional components. When the transfer member has more than one layer, the liquid composition is applied to the substrate or to the topmost intermediate layer, followed by crosslinking of the fluorosilicone polymer, typically by heating to a temperature of from about 200 to about 400° F., although the temperature can be outside of this range, and typically for from about 10 to about 30 minutes, although the time can be outside of this range, and although other crosslinking methods can also be employed.

Examples of suitable fluorosilicones (prior to crosslinking) for the outer layer of the transfer member include, but are not limited to, those of the general formula wherein each of $R_1$, $R_2$, $R_3$, $R_4$, $R_5$, $R_6$, $R_7$, $R_8$, $R_9$, and $R_{10}$, independently of the others, is an alkyl group, including linear, branched, cyclic, unsaturated, and substituted alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, an aryl group, including substituted aryl groups, typically with from 6 to about 18 carbon atoms, preferably with from 6 to about 10 carbon atoms, and even more preferably with from 6 to about 8 carbon atoms, although the number of carbon atoms can be outside of this range, or an arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, provided that at least one of $R_9$ and $R_{10}$ is a fluoro-substituted alkyl, aryl, or arylalkyl group. The average fluorine content of the polyorganosiloxane molecules in the uncrosslinked liquid typically is from about 5 to about 71 percent by weight, although the fluorine content can be outside of this range. Further, m and n are each integers representing the number of repeat monomer units; typically, m is from 0 to about 1,000 and n is from 1 to about 1,000, with the sum of m+n typically being from about 50 to about 5,000, preferably from about 50 to about 1,000, and more preferably from about 50 to about 200, although the number of repeat monomer units can be outside of this range. These polymers generally are random copolymers of substituted and unsubstituted siloxane repeat units, although alternating, graft, and block copolymers are also suitable. The fluorosilicones (prior to crosslinking) for the outer layer of the transfer member are of any suitable or desired effective weight average molecular weight, typically from about 3,600 to about 80,000, and preferably from about 6,000 to about 70,000, and more preferably from about 10,000 to about 30,000, although the weight average molecular weight can be outside of these ranges. Typical number average molecular weights are from about 5,000 to about 20,000, although the number average molecular weight can be outside of this range.

Specific examples of suitable materials of this formula include those of the formula wherein x and y are integers representing the number of repeat monomer units, those of the above formula wherein at least two of the methyl groups are replaced with vinyl groups, as disclosed in, for example, U.S. Pat. No. 4,711,818, the disclosure of which is totally incorporated herein by reference, those of the general formula wherein $R_1$ is a fluoroalkyl group having from about 1 to 18 carbon atoms and from about 3 to 37 fluorine atoms, $R_2$ is an alkyl group having from 1 to 6 carbon atoms, the ratio of x:y is from about 99:1 to about 70:30, and n is an integer such that, before crosslinking, the polymer has a number average molecular weight of from about $1 \times 10^3$ to about $1 \times 10^6$, as disclosed in, for example, U.S. Pat. No. 5,464,703 and U.S. Pat. No. 5,563,202, the disclosures of each of which are totally incorporated herein by reference, other condensation polymers prepared by the condensation reaction of difunctional dialkylsiloxane monomers or oligomers and difunctional fluoroalkylsilane monomers or oligomers, and the like. Specific examples of suitable commercially available fluorosilicones include those available from United Chemical, Piscataway, N.J., the SILASTIC fluorosilicone materials available from Dow Corning Co., Midland, Mich., other fluorosilicones such as nonylfluorohexyl and fluorosiloxanes, including DC94003 and Q5-8601, both available from Dow Corning Co., Midland, Mich., the FSL fluorosilicone materials available from General Electric Corp., Schenectady, N.Y., the Shin-Etsu Fluorosilicone Elastomers, available from Shincor Silicones, Inc., Akron, Ohio, and the like.

Any desired or effective crosslinking agent can be employed. Examples of suitable crosslinking agents include, but are not limited to, hydrogen peroxide, organic peroxides commonly used as crosslinking agents, organic diamine curatives, such as hexamethylene diamine carbamate and N,N'-dicinnamylidene-1,6-hexanediamine (commercially available from E.I. DuPont de Nemours and Co. as Diak® No. 1 and Diak® No. 3, respectively), and the like. The crosslinking agent is present in the liquid composition comprising the fluorosilicone in any desired or effective amount, typically from about 1 to about 10 percent by weight of the fluorosilicone polymer, although the amount can be outside of this range.

The thermal stabilizing agent present in the outer layer of the transfer members of the present invention is a reaction product of a cyclic unsaturated-alkyl-group-substituted polyorganosiloxane, a linear unsaturated-alkyl-groupsubstituted polyorganosiloxane, and a metal-bidentate ligand compound. The bidentate ligand compound is a metal acetylacetonate compound, of the general formula or a metal oxalate compound, of the general formula wherein M represents a divalent or trivalent metal ion, p is an integer representing the charge on the metal ion and is 2 or 3, and q is an integer representing the number of complexed hydrate groups in the compound, and typically ranges from 0 to about 20. Examples of suitable metal ions include (but are not limited to) $Zr^{2+}$, $Zn^{2+}$, $Fe^{2+}$, $Fe^{3+}$, $Ce^{3+}$, $Cr^{2+}$, $Cr^{3+}$, and the like. One particularly preferred metal-bidentate ligand compound is cerium (III) acetylacetonate hydrate, available from, for example, Aldrich Chemical Co., Milwaukee, Wis. The metal-bidentate ligand compound is present in the stabilizing agent in any suitable or effective amount, typically from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane, preferably from about 25 to about 42 parts by weight for every 10 to 22 parts by weight of the cyclic unsaturated-alkyl-group-substituted polyorganosiloxane and every 10 to 22 parts by weight of the linear unsaturated-alkyl-group-substituted polyorganosiloxane, and more preferably about 34 parts by weight for every 17 parts by weight of the cyclic unsaturated-alkyl-group-substituted polyorganosiloxane and every 17 parts by weight of the linear unsaturated-alkyl-group-substituted polyorganosiloxane, although the relative amounts can be outside of these ranges. Expressed another way, the stabilizing agent typically is prepared by beginning with a base of 100 centistoke nonfunctional polydimethyl siloxane oil to facilitate mixing of the ingredients. The stabilizer components are then added to this base. For every 100 parts by weight of the nonfunctional polydimethylsiloxane, typically there are from about 9 to about 59 parts by weight of the metal-bidentate ligand compound, from about 4 to about 30 parts by weight of the cyclic unsaturated-alkyl-group-substituted polyorganosiloxane, and from about 4 to about 30 parts by weight of the linear unsaturated-alkyl-group-substituted polyorganosiloxane. Preferably, for every 100 parts by weight of the nonfunctional polydimethylsiloxane, typically there are from about 25 to about 42 parts by weight of the metal-bidentate ligand compound, from about 10 to about 22 parts by weight of the cyclic unsaturated-alkyl-group-substituted polyorganosiloxane, and from about 10 to about 22 parts by weight of the linear unsaturated-alkyl-group-substituted polyorganosiloxane. More preferably, for every 100 parts by weight of the nonfunctional polydimethylsiloxane, typically there are about 34 parts by weight of the metal-bidentate ligand compound, about 17 parts by weight of the cyclic unsaturated-alkyl-group-substituted polyorganosiloxane, and about 17 parts by weight of the linear unsaturated-alkyl-group-substituted polyorganosiloxane. Again, the relative amounts can be outside of these ranges.

The linear unsaturated-alkyl-group-substituted polyorganosiloxane typically is of the general formula wherein $R_1$ and $R_2$ are selected from the group consisting of hydroxy and alkyl, alkoxy, alkene, and alkyne radicals having 1 to 10 carbon atoms, provided that at least one of $R_1$ and $R_2$ is alkene or alkyne, and m is from 0 to about 350, preferably from about 50 to about 325, and more preferably from about 100 to about 300, although the value of m can be outside of this range. Specific examples of suitable linear unsaturated-alkyl-group-substituted polyorganosiloxanes include materials such as $(CH_2=CH)(CH_3)_2SiOSi(CH_3)_2(CH=CH_2)$ (1,3-divinyl tetramethyl disiloxane), $(CH_2=CHCH_2)_2(CH_3)SiOSi(CH_3)(CH_2CH=CH_2)_2$ (1,1,3,3-tetraally-1,3-dimethyl disiloxane) $(CH_2=CH)(CH_3)(HO)SiOSi(OH)(CH_3)(CH=CH_2)$ (1,3-divinyl-1,3-dimethyl-1,3-dihydroxy disiloxane, $(CH_2=CH)(CH_3)_2SiO(SiO(CH_3)_2)_nSi(CH_3)_2(CH=CH_2)$ (polydimethyl siloxane, vinyl dimethyl terminated, wherein n varies from 1 to about 50, all available from United Chemical Technologies, Piscataway, N.J., and the like, as well as mixtures thereof. One particularly preferred linear unsaturated-alkyl-group-substituted polyorganosiloxane is a vinyl dimethyl terminated polyorganosiloxane, such as those available from, for example, United Chemical Technologies, Piscataway, N.J., as PS496, believed to be of the general formula wherein n represents an integer and typically is from about 100 to about 325, and preferably from about 200 to about 300, although the value of n can be outside of these ranges.

The cyclic unsaturated-alkyl-group-substituted polyorganosiloxane typically is of the general formula wherein $R_3$ is an alkyl radical having from 1 to about 6 carbon atoms or an alkene or alkyne radical having from 2 to about 8 carbon atoms, $R_4$ is selected from the group consisting of alkene and alkyne radicals having from 2 to about 8 carbon atoms, and n is an integer of from about 3 to about 6. Specific examples of suitable cyclic polyorganosiloxanes include alkenylcyclosiloxanes, such as $(CH_2=CH$ (CH$_3$)SiO)$_3$ (1,3,5-triethenyltrimethylcyclotrisiloxane), (CH$_2$=CH(CH$_3$)SiO)$_4$ (1,3,5,7-tetraethenyltetramethylcyclotetrasiloxane), (CH$_2$=CHCH$_2$(CH$_3$)SiO)$_4$(1,3,5,7-tetrallyltetramethylcyclotetrasiloxane), (CH$_2$=CH(CH$_3$)SiO)$_6$ (1,3,5,7,9,11-hexaethenylhexamethylcyclohexasiloxane, all available from United Chemical Technologies, and the like, as well as mixtures thereof. One particularly preferred cyclic unsaturated-alkyl-group-substituted polyorganosiloxane is 1,3,5,7-tetravinyl tetramethyl cyclotetrasiloxane, believed to be of the formula commercially available from, for example, United Chemical Technologies, Piscataway, N.J. as T2160.

Optionally, the stabilizing agent can also contain a nonfunctional polyorganosiloxane oil, such as polydimethylsiloxane; this component is frequently added to the other stabilizing agent ingredients to enhance ease of mixing thereof.

The stabilizing agent can be prepared by any suitable or effective method. For example, the stabilizing agent can be prepared by admixing all of the stabilizer ingredients (i.e., metal-bidentate ligand compound, linear unsaturated-alkyl-group-substituted polyorganosiloxane, and cyclic unsaturated-alkyl-group-substituted polyorganosiloxane), if desired in a base material to facilitate mixing, such as a nonfunctional polydimethylsiloxane oil, agitating the resulting dispersion (in, for example, a ball mill) for from about 1 to about 3 days, subsequently heating the dispersion to a temperature of from about 150 to about 400° F. for from about 1 to about 8 hours, and filtering the dispersion, through, for example, Whatman no. 2 filter paper to obtain the stabilizing agent. The stabilizing agent is then added to the polyorganosiloxane (silicone) oil to obtain a thermally stable material.

The thermal stabilizing agent is present in the liquid composition for the outer layer of the transfer member of the present invention in any desired or effective amount, typically from about 0.01 to about 10 parts per hundred by weight of the liquid composition, preferably from about 0.1 to about 5 parts per hundred by weight of the liquid composition, more preferably from about 0.5 to about 2.5 parts per hundred by weight of the liquid composition, and even more preferably from about 1 to about 2 parts per hundred by weight of the liquid composition, although the amount can be outside of these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Three 21 milliliter headspace vials, each containing 1 gram of GE Silicones Silanol/STPD Fluorosilicone Fluid, were prepared by placing them in a 400° F. oven for 1 week. Thereafter, the vials were analyzed by heating them in a 400° F. oven for 10 minutes. One vial was used as a control sample with no additives. The second vial contained the fluorosilicone with 2 parts per hundred by weight of a thermal stabilizing agent according to the present invention; said thermal stabilizing agent was prepared by admixing 10 grams of cerium (III) acetylacetonate (obtained from Aldrich Chemical Co., Milwaukee, Wis.), 5 grams of vinyl Q-resin (obtained from United Chemical Technologies, Piscataway, N.J.), 5 grams of tetravinyl tetramethyl cyclotetrasiloxane (Vinyl Q-Resin dispersion, obtained from United Chemical Technologies, Piscataway, N.J.), and 40 grams of nonfunctional polydimethylsiloxane (obtained from Xerox Corp., with a viscosity of 100 centiStokes), followed by ball milling at 400° F. for 2.5 hours and subsequent filtering. The third vial contained the fluorosilicone with 2 parts per hundred by weight of a thermal stabilizing agent similar to that in the second vial (and prepared the same way as that in the second vial) except that the thermal stabilizing agent contained no tetravinyl tetramethyl cyclotetrasiloxane. Subsequent to heating at 400° F. for 10 minutes, 2 milliliter volumes of the headspace gases were removed from each of the three vials with gas tight syringes and analyzed by GC/MS on a Finnigan Incos 50 mass spectrometer system. The oven of the gas chromatograph was programmed from 45 to 245° C. at 6° C. per minute and a 30 meter DB-5 column (0.25 millimeter inner diameter) was used. Based on the peak areas of the 64 m/z ion of trifluoropropionaldehyde, the relative amounts of trifluoropropionaldehyde present in the headspace gases of each vial were as follows:

| Vial | Relative Amount TFPA |
|---|---|
| 1 | 268,172 |
| 2 | 35,600 |
| 3 | 549,559 |

As the data indicate, the vial containing the thermally stabilized fluorosilicone according to the present invention exhibited greatly reduced trifluoropropionaldehyde emissions compared to the control and to the vial containing no tetravinyl tetramethyl cyclotetrasiloxane. Similar results are expected for the solid stabilized crosslinked fluorosilicone materials.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square, said transfer member being suitable for use in a transfer assembly to transfer a developed electrostatic latent image from a charge retentive surface to a copy substrate.

2. A transfer member according to claim 1 wherein the fluorosilicone is of the formula wherein each of $R_1$, $R_2$, $R_3$, $R_4$, $R_5$, $R_6$, $R_7$, $R_8$, $R_9$, and $R_{10}$, independently of the others, is an alkyl group, an aryl group, or an arylalkyl group, provided that at least one of $R_9$ and $R_{10}$ is a fluoro-substituted alkyl, aryl, or arylalkyl group, and m and n are each integers representing the number of repeat monomer units.

3. A transfer member according to claim 1 wherein the average fluorine content of the fluorosilicone is from about 5 to about 71 percent by weight.

4. A transfer member according to claim 1 wherein the fluorosilicone has a weight average molecular weight of from about 3,600 to about 80,000.

5. A transfer member according to claim 1 wherein the crosslinking agent is a peroxide or an organic diamine curative.

6. A transfer member according to claim 1 wherein the crosslinking agent is present in the liquid in an amount of from about 1 to about 10 percent by weight of the fluorosilicone.

7. A transfer member according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal acetylacetonate compound.

8. A transfer member according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal oxalate compound.

9. A transfer member according to claim 1 wherein the metal of the metal acetylacetonate or metal oxalate compound is $Zr^{2+}$, $Zn^{2+}$, $Fe^{2+}$, $Fe^{3+}$, $Ce^{3+}$, $Cr^{2+}$, $Cr^{3+}$, or mixtures thereof.

10. A transfer member according to claim 1 wherein the metal acetylacetonate or metal oxalate compound is cerium (III) acetylacetonate hydrate.

11. A transfer member according to claim 1 wherein the thermal stabilizing agent further comprises nonfunctional polyorganosiloxane oil.

12. A transfer member according to claim 1 wherein the linear unsaturated-alkyl-group-substituted polyorganosiloxane is of the formula wherein $R_1$ and $R_2$ are selected from the group consisting of hydroxy and alkyl, alkoxy, alkene, and alkyne radicals having from 1 to about 10 carbon atoms, provided that at least one of $R_1$ and $R_2$ is alkene or alkyne, and m is an integer representing the number of repeat monomer units.

13. A transfer member according to claim 1 wherein the linear unsaturated-alkyl-group-substituted polyorganosiloxane is 1,3-divinyl tetramethyl disiloxane, 1,1,3,3-tetraallyl-1,3-dimethyl disiloxane, 1,3-divinyl-1,3-dimethyl-1,3-dihydroxy disiloxane, vinyl dimethyl terminated polydimethyl siloxane having from 1 to about 50 repeating dimethylsiloxyl units, or mixtures thereof.

14. A transfer member according to claim 1 wherein the linear unsaturated-alkyl-group-substituted polyorganosiloxane is of the formula wherein n is an integer representing the number of repeat monomer units.

15. A transfer member according to claim 1 wherein the cyclic unsaturated-alkyl-group-substituted polyorganosiloxane is of the formula wherein $R_3$ is an alkyl radical, an alkene radical, or an alkyne radical, $R_4$ is an alkene or alkyne radical, and n is an integer of from about 3 to about 6.

16. A transfer member according to claim 1 wherein the cyclic unsaturated-alkyl-group-substituted polyorganosiloxane is 1,3,5-triethenyltrimethylcyclotrisiloxane, 1,3,5,7-tetraethenyltetramethylcyclotetrasiloxane, 1,3,5,7-tetrallyltetramethylcyclotetrasiloxane, 1,3,5,7,9,11-hexaethenylhexamethylcyclohexasiloxane, or mixtures thereof.

17. A transfer member according to claim 1 wherein the cyclic unsaturated-alkyl-group-substituted polyorganosiloxane is 1,3,5,7-tetravinyl tetramethyl cyclotetrasiloxane.

18. A transfer member according to claim 1 wherein the thermal stabilizing agent contains the metal acetylacetonate or metal oxalate compound in an amount of from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane.

19. A transfer member according to claim 1 wherein the transfer member comprises a substrate and, coated onto the substrate, the crosslinked product.

20. A transfer member according to claim 1 wherein the transfer member comprises a substrate, an intermediate layer coated onto the substrate, and an outer layer comprising the crosslinked product coated onto the intermediate layer.

21. A transfer member according to claim 1 wherein the crosslinked product has coated thereover a liquid release agent.

22. A transfer member according to claim 1 wherein the crosslinked product further comprises a filler.

23. A transfer member according to claim 1 wherein the surface resistivity is from about $10^6$ to about $10^{14}$ ohms per square.

24. A transfer member according to claim 1 wherein the surface resistivity is from about $10^8$ to about $10^{12}$ ohms per square.

25. An image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; and (iii) a transfer assembly to transfer the developed image from the charge retentive surface to a copy substrate, wherein the transfer assembly includes a transfer member according to claim 1.

26. An image forming apparatus according to claim 25 wherein the transfer assembly simultaneously transfers the developed image from the charge retentive surface to the copy substrate and fuses the developed image to a surface of the copy substrate.

27. An image forming apparatus according to claim 25 wherein the apparatus further includes (iv) a fixing assembly to fuse toner images to a surface of the copy substrate subsequent to transfer of the developed image to the copy substrate.

28. A process which comprises (i) generating an electrostatic latent image on an imaging member; (ii) developing the latent image by contacting the imaging member with a developer; (iii) transferring the developed image from the imaging member to a transfer member according to claim 1; (iv) transferring the developed image from the transfer member to a copy substrate; and (v) affixing the developed image to the copy substrate.

29. A process according to claim 28 wherein the transfer member simultaneously transfers the developed image from the imaging member to the copy substrate and affixes the developed image to the copy substrate.

30. A process according to claim 28 wherein the developed image is affixed to the copy substrate with a fuser member subsequent to transfer of the developed image from the transfer member to the copy substrate.

\* \* \* \* \*